May 18, 1954
M. M. BARTON
2,678,471
METHOD OF SEALING INSERTS IN CONTAINERS
Filed Oct. 18, 1950
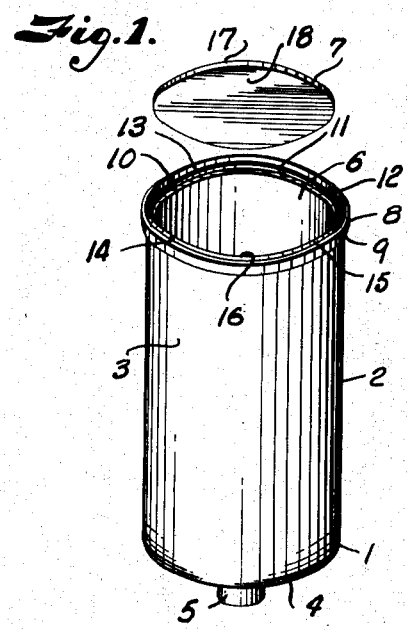
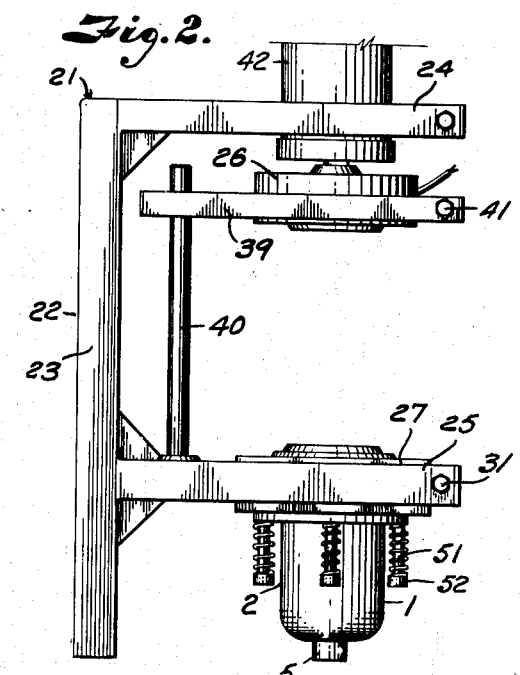
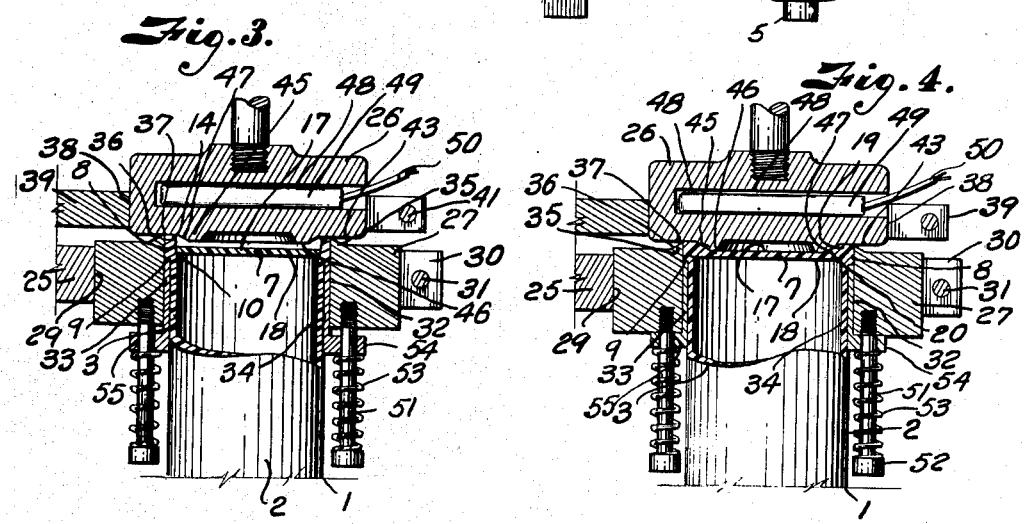
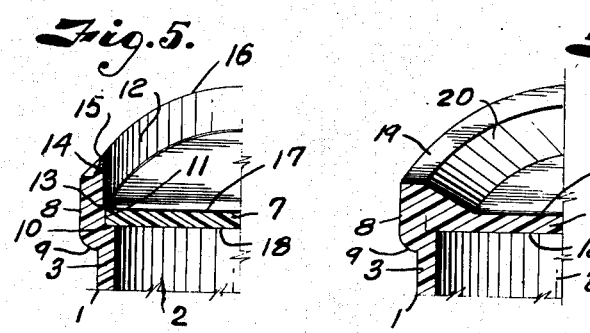
INVENTOR.
Murray M. Barton
BY
ATTORNEYS.

Patented May 18, 1954

2,678,471

UNITED STATES PATENT OFFICE 2,678,471

METHOD OF SEALING INSERTS IN CONTAINERS

Murray M. Barton, Kansas City, Mo., assignor to Injection Molding Company, Kansas City, Mo., a corporation of Missouri Application October 18, 1950, Serial No. 190,847

2 Claims. (Cl. 18—59)

This invention relates to a plastic container and particularly to a method of applying inserts or bottoms in the body of such containers to close the core opening therein.

The principal object of the invention is to provide a relatively large sealed area between the insert and body of the container thereby producing a strong leak-proof container.

In accomplishing this and other objects of the invention as hereinafter pointed out, I have provided an improved method of applying the inserts as illustrated in the accompanying drawing wherein:

Fig. 1 is an inverted perspective view of the body portion of a plastic container showing the open bottom and the insert ready for application thereto.

Fig. 2 is a side elevational view of an apparatus to be used in facilitating seal of the insert in the open bottom of the container, the insert and body portion of the container being shown in the supporting form with heated form retracted.

Fig. 3 is a sectional view showing the heated form in position to start the seal.

Fig. 4 is a similar view after the seal has been completed.

Fig. 5 is an enlarged fragmentary section through the bottom portion of the container showing the insert seated in the open bottom of the container body and prior to sealing thereof.

Fig. 6 is a similar fragmentary section after the seal has been completed.

Referring more in detail to the drawings:

1 designates a hollow body or container such as a bottle having a body portion 2 that is adapted to be formed of plastic material under heat and pressure in a mold. The body portion 2 includes a side wall 3 that may be of cylindrical form and which is provided with a dome-like top 4 having a neck 5. An opening 6 is required to permit removal of the inner mold or core and is closed by an insert or bottom 7 which is also formed of plastic material similar to the body portion of the container. Formed on the body portion of the container is an annular rim 8 providing a shoulder 9 with the wall 3 and to accommodate an inner shoulder 10 for seating the insert 7 thereagainst. The inner face of the rim 8 has cylindrical faces 11 and 12 with the face 12 offset outwardly from the face 11, as indicated at 13. Formed on the rim 8 in coaxial relation with the container is an annular lip 14 having its inner face formed as a continuation of the face 12 and having a tapered outer face 15 joining with the inner face 12 in a relatively thin edge 16. The insert 7 is of disk shape and is of a size to be snugly slidable within the annular face portion 11 and the surfaces 17 and 18 thereof may be substantially flat as shown in Fig. 1. The insert 7 is of a thickness to seat on the inner shoulder with the surface 17 in plane with the offset 13.

In carrying out the present invention, the lip 14 and portion of the rim that projects above the insert (see Fig. 5) is turned over the marginal edge of the insert and fused thereto as shown in Fig. 6, with the fused material pressed into a form which gives a flat base 19 and a tapering inner face 20 for the base of the finished container.

The sealing apparatus 21 may include a frame 22 having an upright 23 carrying laterally extending arms 24 and 25, the arms being spaced apart to accommodate movement of a heated form 26 into and out of contact with a supporting form 27 that is carried by the arm 25. The form 27 consists of a circular body that is mounted in an opening 29 formed in the arm 25. The arm 25 has a slot 30 in its outer end intersecting the opening 29 whereby the form is clamped in position by a fastening device such as a bolt 31 that passes through the end of the arm. The form 27 has an axial bore 32 conforming in diameter with the outer face of the rim 8 of the container to receive the rim therein and to accommodate a slidable supporting ring or sleeve 33 substantially conforming in thickness to the shoulder 9 so that the inner annular face 34 thereof slidably embraces the wall portion 3 of a container as best shown in Fig. 2. Encircling the bore 32 of the form 27 and projecting upwardly therefrom is a rib 35 having a downwardly sloping outer periphery 36 terminating in a ridge 37 adapted to be contacted by the heated form 26 as later described.

The form 26 is clamped in an opening 38 in an arm 39 which is guided for movement to and from the form 27 on a guide pin 40 that extends upwardly from the arm 25 as best shown in Fig. 1. The heated form 26 is secured in the arm 25 by a clamping bolt 41 similar to the attachment of the form 26, previously described.

The upper arm 24 of the frame carries an actuator 42 by which the heated form is brought into contact with the work. The heated form has a substantially flat bottom face 43 adapted to contact the rib 35 on the outer side of the container rim 8. Provided on the face 44 of the heated form is a depending annular rib 45 substantially conforming to the depth of the finished rim so that the bottom face 46 of the rib is adapted to contact the surface 17 of the insert. The outer periphery 47 of the rib 45 is inclined inwardly so as to shape the inner periphery of the rim of the container as later described.

The heated form is provided with a recess 48 for accommodating a heating element 49 that is supplied with a suitable current through conductors 50.

The supporting sleeve 33 is movably carried on pins 51 threaded into the under side of the arm 18 and having heads 52 to seat springs 53. The springs 53 bear upon laterally extending ears 54 of the sleeve to support the sleeve resiliently on the guide pins. The ears 54 have apertures 55 through which the pins extend.

In making a seal, the heated form is moved to retracted position as shown in Fig. 2 to allow space for inserting the body of a container bottom side up within the opening of the form 27 so that the shoulder 9 seats upon the sleeve 33, the bottom insert 7 having previously been applied as shown in Fig. 5. The heated form is then moved to bring the face 43 of the form into contact with the rib 35 of the form 27. In this position the point of the lip makes contact with the heated form to start fusing thereof. As the material fuses, the lifting action of the springs raises the body of the container to maintain contact with the heated form. Since the lip is relatively thin at the initial contact, the material starts to flow immediately and the flow increases as the thicker portion of the run begins to melt and as the pressure is applied on the body of the container to maintain contact, the melted material fills the spaces between the form faces to give the desired shape.

When the insert is thus sealed in the body of the container, the base thereof is accurately shaped and there is no subsequent operations necessary in trimming off flashes or correcting deformities. There is also no need for testing the containers since all of the containers will have a leak-tight, accurately formed seal because of the relatively large homogeneous weld of the rim of the container with the bottom face of the insert.

What I claim and desire to secure by Letters Patent is:

1. The method of permanently securing a thermoplastic closure to an open end wall portion of a thermoplastic container, there being a stop means inwardly of the open end of the container and the closure having a substantially flat outer face providing a marginal fusible portion in plane with said face, the end wall portion of the container being of greater length from said stop means than the thickness of the closure to provide an outwardly projecting fusible portion, which method comprises inserting the closure into the open end of the container to engage the stop means with said fusible portion of the end wall projecting beyond said fusible portion of the outer face of the closure, whereby the fusible portion of the closure is surrounded by the outwardly projecting fusible portion of the end wall of the container and which presents a continuous outer terminal, supporting said end wall portion of the container about the entire perimeter thereof to maintain the outer shape of said end wall portion, applying heat and pressure directly to and co-extensive with said terminal to fuse and flow the fusible material thereof into heating contact with said outer face of the closure to fuse said peripheral portion of said outer face, confining flow of the fused material from spreading beyond the inner perimeter of said fused portion of the closure, removing the heat and pressure, and allowing the fused material to set to form an integral seal between the end wall portion of the container and said closure.

2. The method of permanently securing a thermoplastic closure to an open end wall portion of a thermoplastic container, there being a stop means inwardly of the open end of the container and the closure having a substantially flat outer face providing a fusible portion in plane with said face, the end wall portion of the container being of greater length from said stop means than the thickness of the closure to provide a fusible portion projecting beyond the outer face of the closure and having a tapering terminal, which method comprises inserting the closure into the open end of the container to engage the stop means with said fusible portion of end wall projecting beyond said outer face of the closure, whereby the fusible portion of the closure is surrounded by the outwardly projecting fusible portion of said end wall, supporting said wall portion of the container about the entire perimeter thereof to maintain the outer shape of said end wall portion, applying heat and pressure directly to and co-extensive with said tapering terminal to start fusing of the material, progressively maintaining the heat and pressure on the fusing material to flow the material into heating contact with said outer face of the closure to fuse said peripheral portion of said outer face, confining flow of the fused material from spreading beyond the inner perimeter of said fused portion of the closure, removing the heat and pressure, and allowing the fused material to set to form an integral seal between the end wall portion of the container and said closure.

References Cited in the file of this patent

UNITED STATES PATENTS

| Number | Name | Date |
|---|---|---|
| 1,678,330 | Clyne | July 24, 1928 |
| 1,784,216 | Aldrich | Dec. 9, 1930 |
| 1,981,334 | Schmalz | Nov. 20, 1934 |
| 2,122,325 | Rumball | June 28, 1938 |
| 2,169,315 | Yngve | Aug. 15, 1939 |
| 2,546,208 | Barton | Mar. 27, 1951 |
| 2,588,604 | Archer | Mar. 11, 1952 |

FOREIGN PATENTS

| Number | Country | Date |
|---|---|---|
| 597,666 | Great Britain | Jan. 30, 1948 |